US007185002B1

(12) United States Patent
Allen et al.

(10) Patent No.: US 7,185,002 B1
(45) Date of Patent: Feb. 27, 2007

(54) SYSTEMS AND METHODS FOR DATA RETRIEVAL, MANIPULATION, AND DELIVERY

(75) Inventors: Rick A. Allen, Louisville, KY (US); Robert H. Wright, Ramsey, IN (US); Willard Weitlauf, Louisville, KY (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 448 days.

(21) Appl. No.: 10/279,563

(22) Filed: Oct. 24, 2002

(51) Int. Cl.
*G06F 17/30* (2006.01)

(52) U.S. Cl. ....................... 707/3; 701/1; 701/2; 701/5; 701/10

(58) Field of Classification Search .................... 707/3, 707/4, 2, 10, 5; 709/206
See application file for complete search history.

(56) References Cited

U.S. PATENT DOCUMENTS 5,826,269 A * 10/1998 Hussey ........................ 707/10
6,385,644 B1 * 5/2002 Devine et al. .............. 709/206
6,434,601 B1 * 8/2002 Rollins ....................... 709/206
6,594,689 B1 * 7/2003 Nowatzki et al. ........... 709/208
6,631,402 B1 * 10/2003 Devine et al. .............. 709/217
6,633,851 B1 * 10/2003 Engler et al. ................. 705/21
6,694,316 B1 * 2/2004 Langseth et al. ............. 707/10
6,708,205 B2 * 3/2004 Sheldon et al. ............. 709/206
6,732,092 B2 * 5/2004 Lucas et al. .................... 707/3
6,775,691 B1 * 8/2004 Kubik et al. ................ 709/206
6,816,863 B2 * 11/2004 Bates et al. ................... 707/10
6,829,636 B1 * 12/2004 Kubik et al. ................ 709/206
6,944,662 B2 * 9/2005 Devine et al. .............. 709/225
6,957,248 B2 * 10/2005 Quine et al. ................ 709/206
6,959,324 B1 * 10/2005 Kubik et al. ................ 709/206
7,096,220 B1 * 8/2006 Seibel et al. .................. 707/10

* cited by examiner

*Primary Examiner*—Don Wong
*Assistant Examiner*—Thanh-Ha Dang
(74) *Attorney, Agent, or Firm*—Withers & Keys, LLC

(57) ABSTRACT

Systems and methods are disclosed that include a user interface that enables a user to request a pre-defined report. The user may specify either or both of an electronic mail delivery address for the report and an interval at which the report is to be updated. Such systems and methods enable a particular report to be produced and formatted only once, and then provided to multiple users, thereby eliminating the production and formatting of redundant reports.

13 Claims, 7 Drawing Sheets

Fig. 1

```
SQL QUERY

SELECT NM, CSCOE, FT, RECOT, CLD, RP, TORDISP, FDIS, DISP
FROMDK06, VCURTRH1
WHERE
CAT='1' AND MC=0


***END****



COMMAND ===>
```

100

(Prior Art)

| | | | | | | |
|---|---|---|---|---|---|---|
| gfhdsa | djfhs | sdfj | 90947 | | | |
| gfhdsa | djfhs | sdfj | 90947 | | | |
| gfhdsa | djfhs | sdfj | 90947 | | | |
| | | | | | | |
| | | | | May | 2000 | $50 |
| | | | | June | 2000 | $55 |
| | | | | July | 2000 | $30 |

Server 430
Network
420
Database 440
Workstation 410

SYSTEMS AND METHODS FOR DATA RETRIEVAL, MANIPULATION, AND DELIVERY

FIELD OF THE INVENTION

The present invention relates to database systems. More specifically, the invention relates to systems and methods for user-friendly retrieval, manipulation, delivery, and formatting of data.

BACKGROUND OF THE INVENTION

A data report includes an organized collection of data. Such a report may be compiled by querying a database for data, which may be imported into a spreadsheet. The spreadsheet may be used to assemble the data into visual aides such as tables, charts, and graphs. The data may be limited to a desired time period such as a week, a month, or a year. The report may be updated at desired intervals by resubmitting the query to the database and importing the newly retrieved data into the spreadsheet.

The compilation of such reports is often labor-intensive and expensive. One reason for the high expense of report compilation is the cost of writing queries. Writing queries is expensive because it requires a proficiency in a query language such as, for example, Structured Query language (SQL). Multiple complex queries may often be required to generate a single report. Thus, to compile a large number of reports, a large number of programmers proficient in a query language must be acquired and retained.

Due to the expense of writing queries, a set of queries necessary to compile a report may be saved. Saving queries enables a report to be updated at desired intervals without having to rewrite the queries. However, even if a report is updated using a set of saved queries, the retrieved data still must be repetitively manipulated upon its receipt. For example, if a report is generated using a spreadsheet, then the data must be manually imported into the spreadsheet every time the report is updated. The manual importation of the retrieved data into the spreadsheet is time-consuming and expensive. Specifically, columns of the spreadsheet must be adjusted to fit the retrieved data.

Another reason for the high cost of report compilation is that the processors used to submit queries and to manipulate data are expensive to operate. Adding to the expense of processor operation is that multiple authors may request redundant reports. The compilation of such redundant reports results in the incurrence of processor expenses to submit redundant sets of queries and to manipulate redundant data.

Thus, there is a need in the art for systems and methods that enable users without query-writing proficiency to request certain predefined reports. There is further a need for such systems and methods to automatically import data into a format that is suitable for such a report, and to provide such reports to multiple users based on only a single retrieval of the data required to build the report.

SUMMARY OF THE INVENTION

A user interface enables a user to request a report. The requested report may be selected from a group of available reports. The request may include an interval at which the report is to be updated. The request may also include an electronic mail address at which to deliver the report.

Sets of one or more pre-defined queries may be stored at a server. Each set of pre-defined queries may be associated with a respective report in the group of available reports. When a report is requested, the respective set of pre-defined queries associated with the requested report is submitted to a database. The query results may be formatted using an electronic spreadsheet.

The validity of the electronic mail delivery address may be verified. If the address is valid, the formatted report may be delivered to the address. If the address is invalid, the request may be ignored.

The report may be updated at the requested interval by resubmitting the stored set of pre-defined queries. The validity of the delivery address may be verified at each update interval. If the address remains valid, the updated report may be delivered to the delivery address.

BRIEF DESCRIPTION OF THE DRAWINGS

The illustrative embodiments will be better understood after reading the following detailed description with reference to the appended drawings, in which:

FIG. 1 is an exemplary prior art user interface for defining a query to be run on a database;

FIG. 2 is an exemplary prior art spreadsheet file including imported query results;

DETAILED DESCRIPTION

Figure 3:
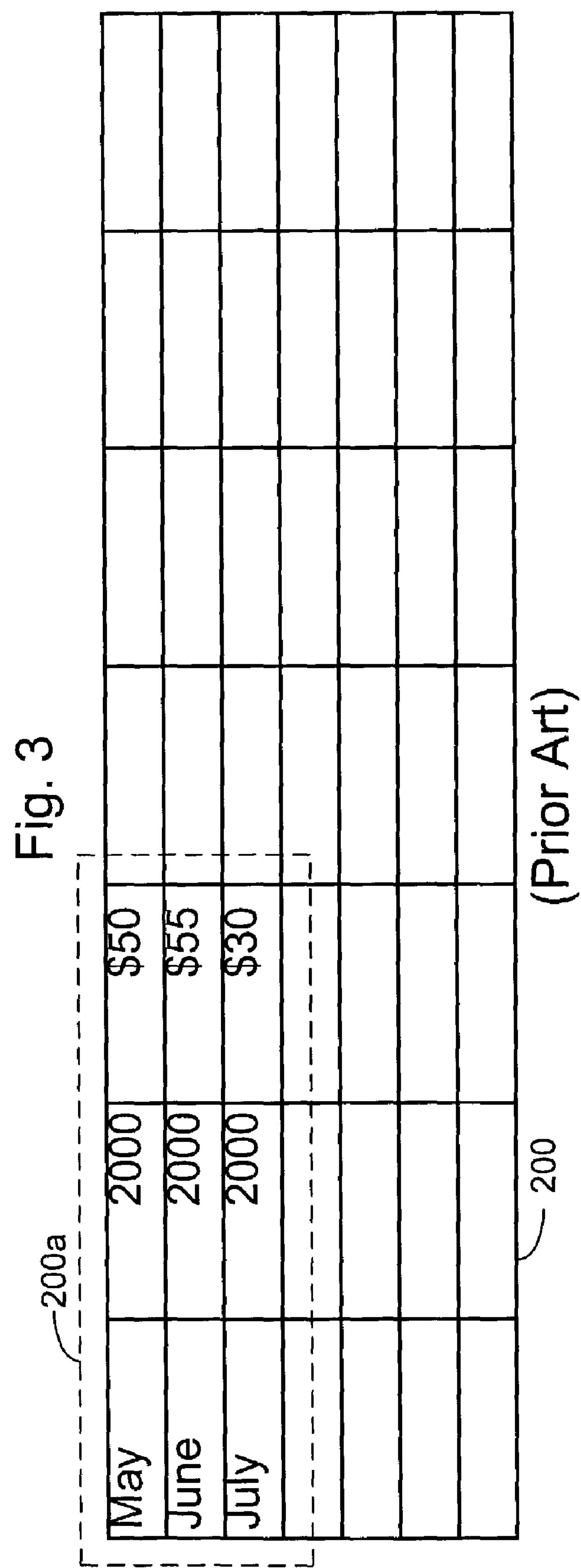
FIG. 3 is an exemplary prior art spreadsheet file including an edited report.

Presently preferred exemplary embodiments of the invention are described below with reference to aforementioned figures. Those skilled in the art will readily appreciate that the description given herein with respect to those figures is for explanatory purposes only and is not intended in any way to limit the scope of the invention. Throughout the description, like reference numerals will refer to like elements in the respective figures.

Generally, a system according to the invention includes a user interface that enables a user to request a pre-defined report. The user may specify an electronic mail delivery address for the report. The user may also specify an interval at which the report is to be updated. The invention enables a particular report to be produced and formatted only once, and then submitted to multiple users, thereby eliminating the production and formatting of redundant reports.

In prior art methods for compiling a report, the report is reproduced and reformatted every time it is prepared. The production of the report includes defining a set of one or more queries directed to the report data. The queries are run on a database, and the query results are received from the database. The received results may be saved in a text file. The results are then formatted into a report. The results may be formatted into a report by opening the text file with an electronic spreadsheet. The spreadsheet may be used to manipulate the query results into a table or chart.

An exemplary prior art user interface for defining a query to be run on a database is shown in FIG. 1. As shown, the user interface 100 is displayed on a device such as, for example, a monitor connected to a personal computer. A user may access the user interface 100 by accessing a database management system (DBMS) running on the personal computer. Upon accessing the DBMS, the user may be required to login.

User interface 100 includes an exemplary query. The query is written in Structured Query Language (SQL), and it includes three statements: a "select" statement, a "from" statement, and a "where" statement. To write a query such as the query shown in FIG. 1, the user must have a proficiency in a query language such as SQL. User interface 100 also includes a command prompt at which a user may enter a command to run the query. For example, the user may press the "F2" key on a keyboard to run the query.

After the query has been run on a database, the query results are received from the database. The received results may be saved in a text file. The results are then formatted into a report. The results may be formatted into a report by opening the text file with an electronic spreadsheet. An exemplary prior art spreadsheet file including imported query results is shown in FIG. 2. As shown, spreadsheet 200 includes multiple rows and columns. The user may make the rows and columns an appropriate size to fit the data by selecting an "Auto Fit" option in a menu (not shown).

The exemplary report 200*a* is shown in FIG. 2 at the bottom right portion of spreadsheet 200. Exemplary report 200*a* includes sales information for various months in the year 2000. Spreadsheet 200 may display the data in the report in an undesired format. For example, spreadsheet 200 may format numerical data in scientific notation rather than in regular decimal form. To ensure that the data is displayed in the desired formats, the user must set default settings of spreadsheet 200 to the desired formats. Such setting of default format settings may be time consuming and may require a proficiency in using spreadsheet 200.

In addition to including the desired report data, the imported file may also include extraneous data 200*b* related to the processing of the query. Such data is shown in FIG. 2 in the top left portion of spreadsheet 200. The user may delete any or all of extraneous data 200*b* by highlighting the unwanted data and striking a "delete" key on an attached keyboard. If the imported file includes a large amount of data, the deletion of extraneous data 200*b* may be a time consuming process. An exemplary prior art spreadsheet 200 including an edited report 200*a* is shown in FIG. 3. As shown, extraneous data 200*b* included in the original imported spreadsheet file 200 has been deleted.

The systems and methods of the present invention enable a report such as the report shown in FIG. 3 to be compiled and delivered to multiple users without redundant production and formatting. As set forth above with reference to prior art FIGS. 1–3, such production and formatting may be time consuming and may require a proficiency in query language and formatting applications. Furthermore, the systems and methods of the present invention enable a report to be automatically updated at requested intervals and delivered to a requested electronic mail delivery address.

Figure 4:
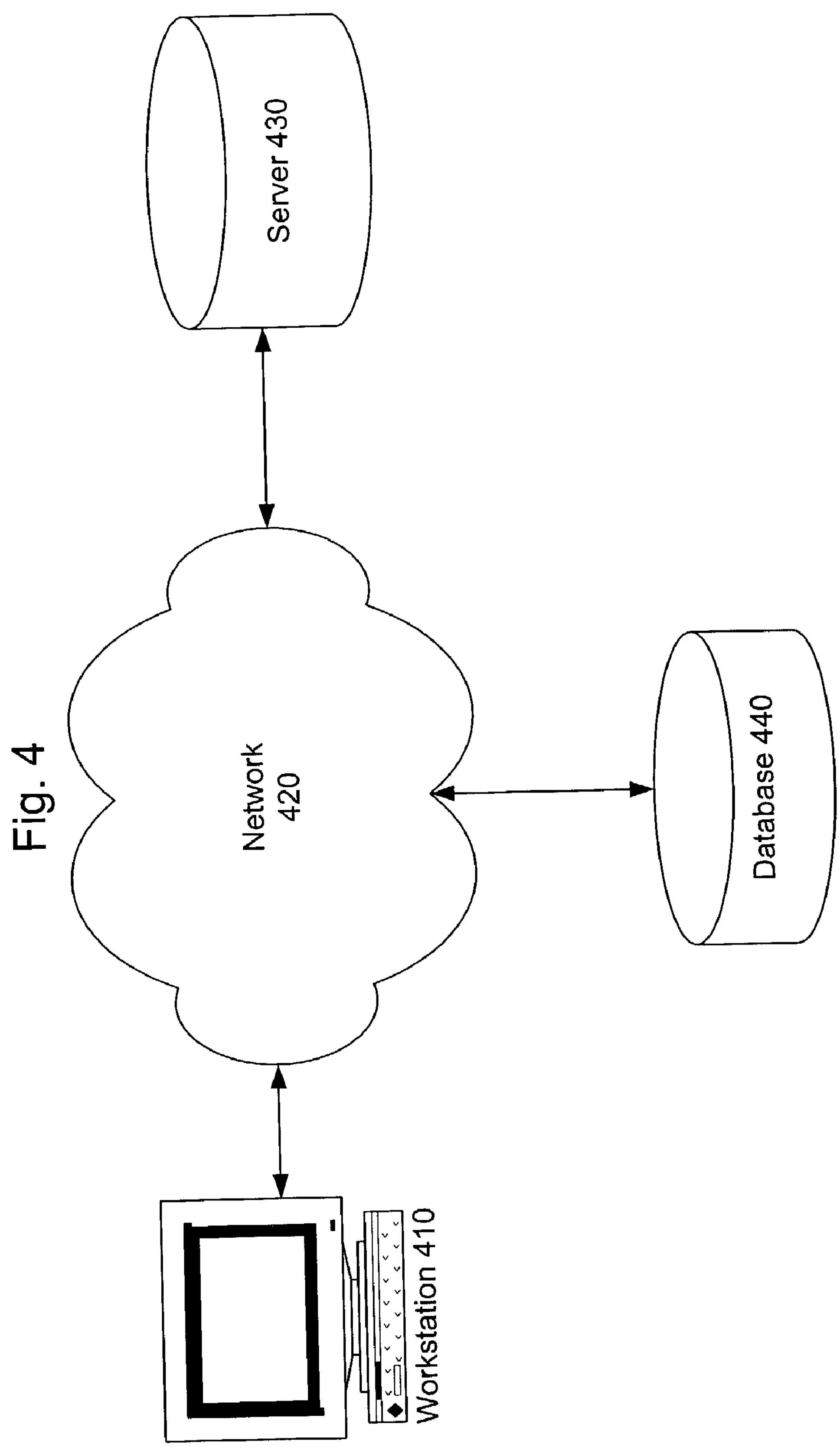
FIG. 4 is a block diagram of a system for data retrieval, manipulation, and delivery in accordance with the present invention.

A block diagram of a system for data retrieval, manipulation, and delivery in accordance with the invention is shown in FIG. 4. As shown, a user at workstation 410 may request a report using a user interface according to the invention. A user interface according to the invention may be an application that may run on workstation 410. Workstation 410 may be a desktop personal computer or a portable personal computing device such as a laptop computer. The user may request a report selected from a group of available reports. The user may also request an electronic mail address to which to deliver the report.

The request is submitted to server 430 over network 420. Network 420 is preferably a local area network (LAN), but it may also be a wide area network (WAN) such as the Internet. Server 430 may process the request by retrieving a set of one or more pre-defined queries directed to the requested report. The pre-defined set of queries may be stored at Server 430. Server 430 submits over Network 420 the retrieved set of queries to database 440. The query is run at database 440, and the query results are submitted to Server 430 over Network 420. Server 430 receives and formats the query results into a report. The report may be formatted using an electronic spreadsheet running at Server 430.

The formatted report may be delivered to the electronic mail address specified by the user. The user may access his or her electronic mail account through an application running on workstation 410. The application may download the electronic mail directly from Server 430 over Network 420. Sever 430 may also deliver the electronic mail to another electronic mail server (not shown). The application running at workstation 410 may download the electronic mail from the electronic mail server.

Figure 5:
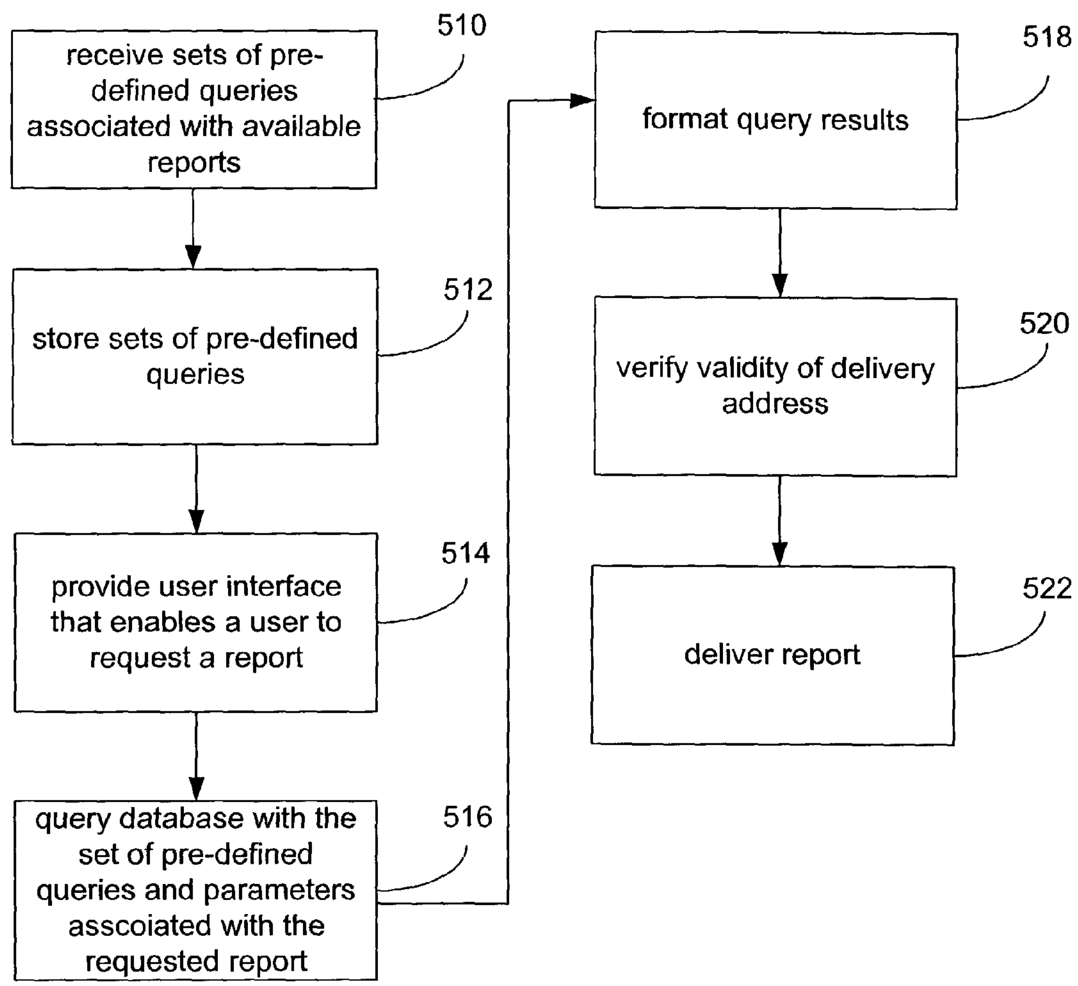
FIG. 5 is a block diagram of a method for data retrieval, manipulation, and delivery in accordance with the present invention.

A flowchart of a method for data retrieval, manipulation, and delivery in accordance with the present invention is shown in FIG. 5. As shown, at step 510, server 430 receives sets of one or more pre-defined queries. Each set of queries is associated with a report in a group of available reports. The queries may be defined at a remote personal computer such as, for example, workstation 410, and submitted to server 430 over Network 420. The queries may be written in a query language such as, for example structured query language (SQL). At step 512, the sets of queries are stored at database 440. The reports in the group of available reports may be periodically added or removed, and the sets of queries associated with those reports may also periodically be respectively added or removed. Furthermore, the queries may be periodically edited or redefined.

At step 514, server 430 provides a user interface that enables a user to request a report. The user interface may be downloaded by a remote personal computer such as, for example, workstation 410 over network 420. The user interface may be updated periodically. The user interface may enable a user to request a report selected from the group of available reports. The request may include an interval at which the report is to be updated and an electronic mail delivery address for the report.

The user interface may also enable a user to contact a system administrator to request a "new" report that is not included in the group of available reports. The system administrator may define a "new" set of queries associated with the new report. The new report may be added to the group of available reports, and the new set of queries may be submitted to server 430 and stored at database 440, thereby enabling the new report to be subsequently requested by later users.

At step 516, server 430 queries database 440 with the set of queries and parameters associated with a requested report. The set of queries and parameters is submitted to database 440 over network 420. After the query is performed, the query results are received at server 430. At step 518, server 430 formats the query results. Server 430 may format the query results using an electronic spreadsheet. The formatting is performed automatically using a predefined routine. That is, the report may be formatted without user intervention.

At step 520, server 430 verifies the validity of the electronic mail delivery address. The address may be verified by contacting the mail server associated with the delivery address. If the deliver address is invalid, the request may be ignored. If the deliver address is valid, the report is delivered to the address at step 522.

After the requested report has been delivered, the report may be updated at the interval requested at step 514. The report may be updated by repeating step 516, in which database 440 is queried with the set of queries associated with the requested report. The results of the resubmitted set of queries are used to compile an updated report with updated data. The updated report may be formatted and delivered to the requested address at the requested interval. The validity of the requested address may be verified again.

Figure 6:
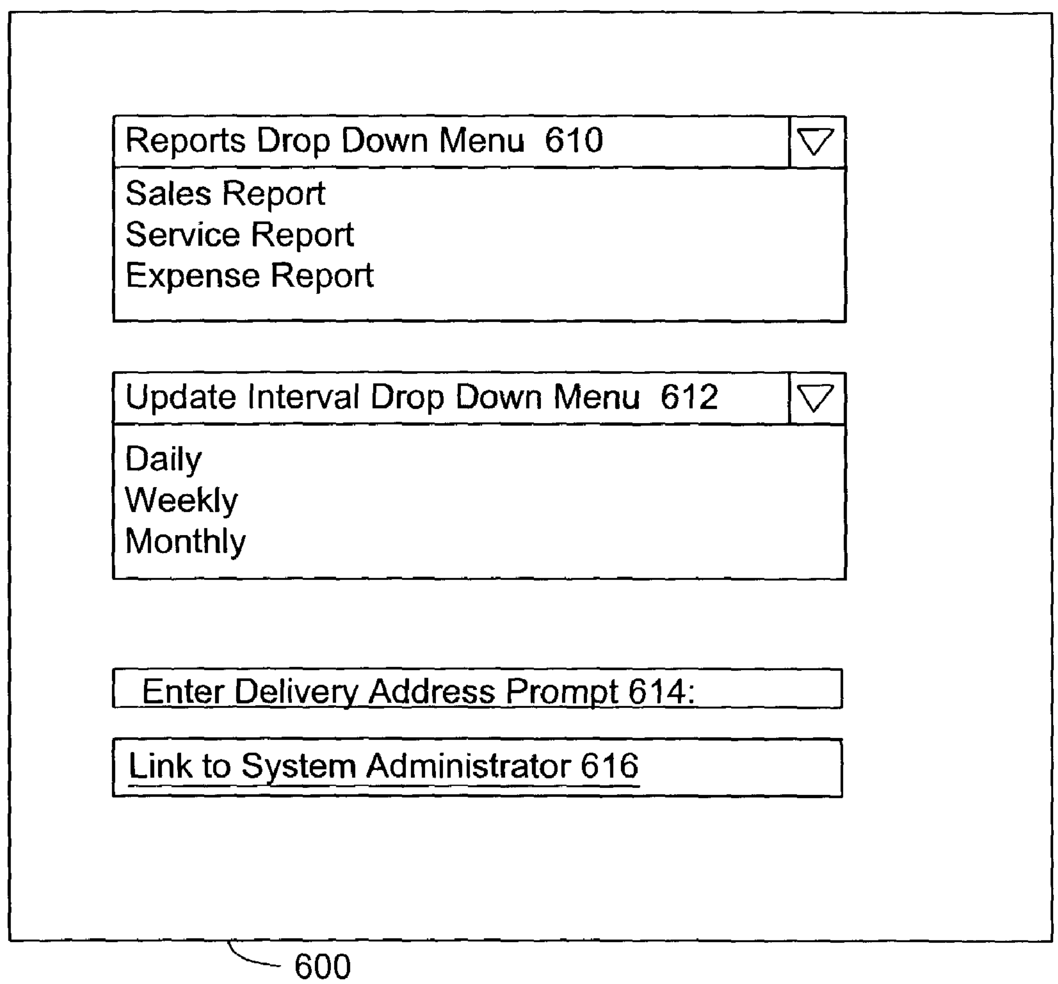
FIG. 6 is an exemplary user interface in accordance with the present invention.

An exemplary user interface in accordance with step 514 of FIG. 5 is shown in FIG. 6. As shown, user interface 600 may include a reports drop down menu 610, an update drop down menu 612, a deliver address prompt 614, and a link to the system administrator 616. User interface 600 may be provided by server 430, and downloaded over network 420 by a remote personal computer such as, for example, workstation 410. Server 430 may periodically change or update user interface 600.

User interface 600 may include drop down menu 610 for displaying the reports in the group of available reports. Reports may be periodically added or removed from drop down menu 610. A pre-defined set of queries associated with each report in drop down menu 610 may be stored at database 440. User interface 600 may also include drop down menu 620 for displaying the available update intervals for the requested report. The report requested at drop down menu 610 may be updated at the interval selected at drop down menu 612 by repeating step 516 of FIG. 5, in which database 440 is queried with the set of queries associated with the requested report.

User interface 600 may also include delivery address prompt 614. The report requested at drop down menu 610 may be delivered to the address entered at prompt 614. Updated reports compiled at the interval selected at drop down menu 612 may also be delivered to the address entered at prompt 614. The address entered at prompt 614 may be verified before the report is delivered. If the address is invalid, the request may be ignored.

User interface 600 may also include system administrator link 616. Link 616 enables a user to contact a system administrator to request a "new" report that is not included in the group of available reports displayed at drop down menu 610. The system administrator may define a "new" set of queries associated with the new report. The new report may be added to the group of available reports displayed at drop down menu 610, and the new set of queries may be submitted to server 430 and stored at database 440, thereby enabling the new report to be subsequently requested by later users.

Figure 7:
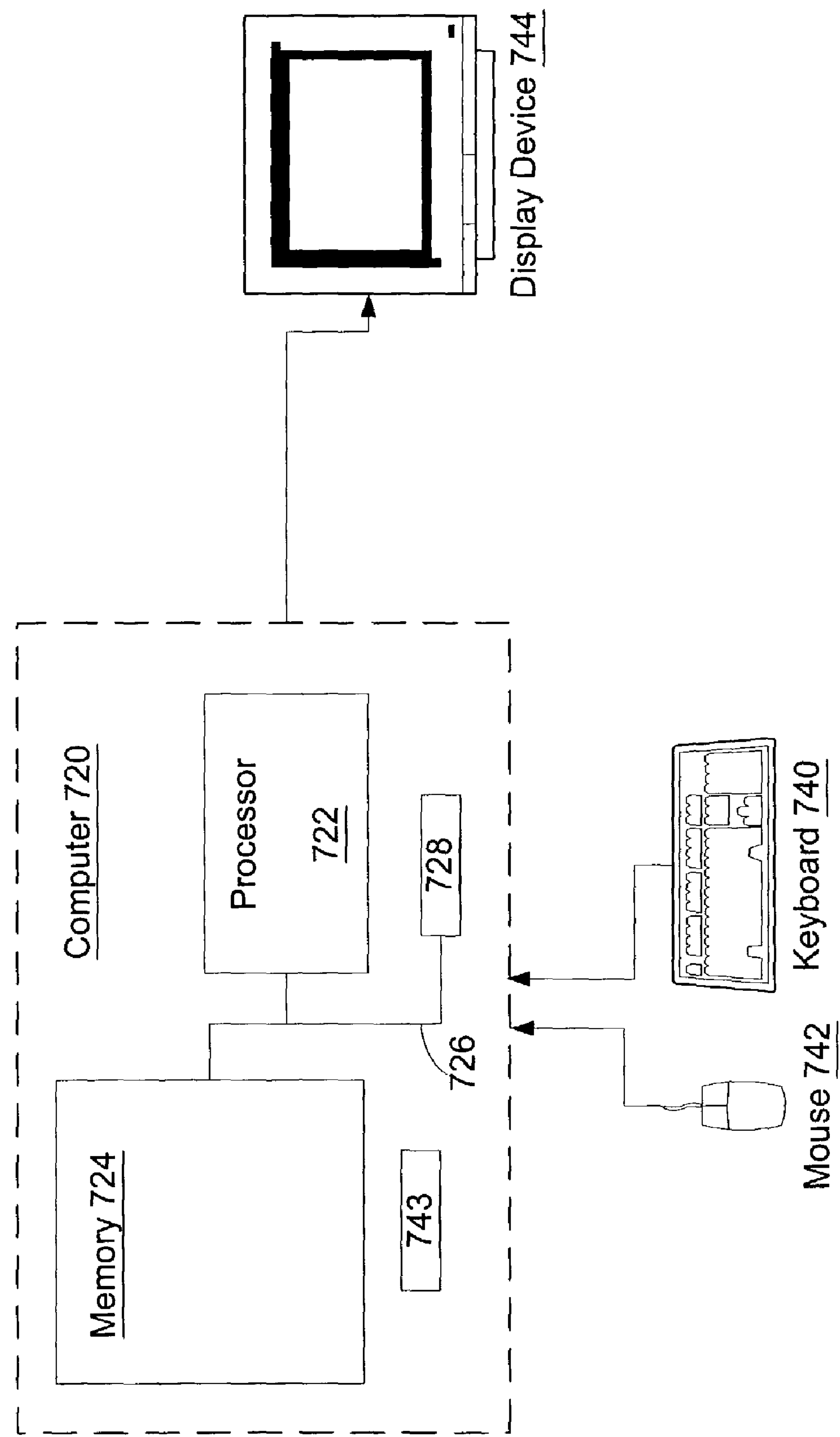
FIG. 7 is a high level diagram of an exemplary computer network for communicating electronic data that can be used in accordance with the present invention.

The FIG. 7 is a block diagram of a generic computing system suitable for use in a system in accordance with the present invention. As shown, computing device 720 includes processing unit 722, system memory 724, and system bus 726 that couples various system components including system memory 724 to the processing unit 722. The system memory 724 might include read-only memory (ROM) and random access memory (RAM). The system might further include hard-drive 728, which provides storage for computer readable instructions, data structures, program modules and other data. A user may enter commands and information into the computer 720 through input devices such as a keyboard 740 and pointing device 742 which may be, for example, a mouse or remote control. A monitor 744 or other type of display device is also connected to the system for output. Communications device 743, which in one embodiment may be a modem, provides for communications over a network such as, for example, the Internet. Processor 722 can be programmed with instructions to interact with other computing systems so as to perform the techniques described above with reference to FIG. 5. The instructions may be received from a network or stored in memory 724 and/or hard drive 728. Processor 722 may be loaded with any one of several computer operating systems such as Windows NT, Windows 2000, or Linux.

Thus, a system and method for data retrieval, manipulation, and delivery has been disclosed. The present invention includes a user interface that enables a user to request a pre-defined report. The user may specify an electronic mail delivery address for the report. The user may also specify an interval at which the report is to be updated. The present invention enables a particular report to be produced and formatted only once, and then submitted to multiple users, thereby eliminating the production and formatting of redundant reports.

While the present invention has been described in connection with the preferred embodiments of the various figures, it is to be understood that other similar embodiments may be used or modifications and additions may be made to the described embodiment for performing the same function of the present invention without deviating therefrom. For example, while the present invention is described above in connection with formatting a report using an electronic spreadsheet, any formatting application may be used. Therefore, the present invention should not be limited to any single embodiment, but rather should be construed in breadth and scope in accordance with the appended claims.

The invention claimed is:

1. A computer-implemented method for data retrieval, the method comprising:

providing a user interface to a server that enables a user to enter a request to generate a report, the request including an electronic mail delivery address associated with the requested report and an interval at which the requested report is to be updated, wherein the interface also includes a system administrator link which enables the user to request an additional report not included in a group of available reports;

retrieving a pre-defined set of queries associated with a requested report by the server to generate the report upon the occurrence of the each interval, wherein the requested report is one of the group of available reports;

generating the requested report by submitting the pre-defined set of inquiries upon each occurrence of the interval by submitting the pre-defined set of queries to a database;

receiving a result based in part in the pre-defined set of inquiries from the database by the server, wherein the server formats the report;

prior to the server attempting to send the report to the electronic mail delivery address of the user upon the occurrence of each of the intervals specified in the request, determining whether the electronic mail delivery address of the user is valid by the server contacting a mail server associated with the electronic mail delivery address;

if the electronic mail delivery address is determined to be not valid, then not attempting to send the report by the server for this occurrence of the interval; and if the electronic mail delivery address is determined to be valid, then sending the requested report by the server to the electronic mail delivery address for the occurrence of the interval.

2. The computer-implemented method of claim 1, wherein providing the user interface comprises providing a user interface that enables the user to select the requested report from a group of available reports.

3. The computer-implemented method of claim 1, further comprising: storing the pre-defined set of queries.

4. The computer-implemented method of claim 1, further comprising: formatting the requested report.

5. The computer-implemented method of claim 4, wherein formatting the requested report comprises importing the requested report into an electronic spreadsheet.

6. The computer-implemented method of claim 1, wherein the providing a user interface to a server that enables a user to enter a request to generate a report includes providing a plurality of electronic mail delivery addresses associated with the requested report, and wherein sending the requested report by the server to the electronic mail delivery address includes sending the requested report substantially simultaneously by the server to the plurality of electronic mail delivery addresses for the occurrence of the interval.

7. A computer-implemented method for data retrieval, the method comprising:

receiving a plurality of pre-defined query sets resident on a server, each said query set being associated with a respective report, the respective reports forming a group of available reports;

providing a user interface that enables a user to submit a request to the server to generate a report selected from the group of available reports, the request comprising an electronic mail delivery address associated with the report, wherein further the user interface comprises an update drop down menu for displaying an available interval at which the requested report is to be updated, a report drop down menu for displaying the reports in the group of available reports, a system administrator link which enables the user to request an additional report not included in the group of available reports from the system administrator;

prior to the server sending the requested report upon an occurrence of the interval, determining whether the electronic mail delivery address is valid;

if the electronic mail delivery address is net determined to be not valid, then not sending the report; and if the electronic mail delivery address is determined to be valid, then sending the requested report to the electronic mail delivery address upon the occurrence of the interval, the requested report being generated upon each occurrence of the interval by submitting to a database the pre-defined query set that is associated with the requested report.

8. The computer-implemented method of claim 7, further comprising: storing the pre-defined sets of queries.

9. The computer-implemented method of claim 7, further comprising: terminating delivery of the requested report in response to a termination request.

10. The computer-implemented method of claim 7, further comprising: formatting a set of query results corresponding to the pre-defined query set.

11. The computer-implemented method of claim 10, wherein formatting the set of query result comprises formatting the set of query results into an electronic spreadsheet.

12. A computer-readable medium having stored thereon computer executable instructions for performing a method comprising:

providing a user interface that enables a user to enter a request to generate a report, the request comprising at least one electronic mail delivery address associated with the requested report, and wherein the request further comprises an interval at which the requested report is to be updated, wherein further the interface enables the user to request an additional report not included in the group of available reports from a system administrator by providing a system administrator link;

retrieving a pre-defined set of queries associated with a requested report from a server, wherein the requested report is one of a group of available reports;

prior to sending the requested report by the server upon an occurrence of the interval, determining by the server whether the electronic mail delivery address is valid;

if the electronic mail delivery address is determined to be not valid, then not sending the report; and if the electronic mail delivery address is determined to be valid, then sending the requested report to the electronic mail delivery address, the requested report being generated upon each occurrence of the interval by submitting the pre-defined set of queries to a database.

13. A computer-readable medium having stored thereon computer-executable instructions for performing a method comprising:

providing a user interface with a server that enables a user to submit a request to generate a report selected from the group of available reports, the request comprising at least an electronic mail delivery address associated with the report and an interval at which the requested report is to be updated, wherein the interface also includes a system administrator link which enables the user to request an additional report not included in the group of available resorts;

generating the requested report by submitting the pre-defined set of inquiries upon each occurrence of the interval by submitting the pre-defined set of queries to a database;

receiving a result based in part in the pre-defined set of inquiries from the database by the server, wherein the server formats the report;

prior to sending the requested report from the server, determining whether the electronic mail delivery address is valid by the server contacting a mail server associated with the electronic mail delivery address;

if the electronic mail delivery address is determined to be not valid, then not sending of the report; and if the electronic mail delivery address is determined to be valid, then sending the requested report from the server to the electronic mail delivery address upon the occurrence of the interval.

* * * * *